United States Patent Office 3,410,852
Patented Nov. 12, 1968

3,410,852
PROCESS FOR PREPARING 3,4-DIHYDRO-2,4-DIOXO-2H-PYRIDO[2,3-e][1,3]OXAZINE
Niels Clauson-Kaas, Farum, Denmark, and Rolf Denss, Basel, Frank Ostermayer, Riehen, and Ernst F. Renk, Basel, Switzerland, assignors to Geigy Chemical Corporation, Greenburgh, N.Y., a corporation of Delaware
No Drawing. Application Sept. 18, 1963, Ser. No. 310,191, now Patent No. 3,245,998, dated Apr. 12, 1966, which is a continuation-in-part of application Ser. No. 236,712, Nov. 9, 1962. Divided and this application Feb. 7, 1966, Ser. No. 559,010.
Claims priority, application Switzerland, Nov. 14, 1961, 13,217/61; Sept. 26, 1962, 11,346/62, 11,347/62
7 Claims. (Cl. 260—244)

ABSTRACT OF THE DISCLOSURE 3,4 - dihydro - 2,4 - dioxo - 2H - pyrido[2,3-e][1,3]oxazine (I) is prepared from 5-(2'-furyl)-hydantoin (II) by the action thereon of an oxidizing agent (Cl, Br, etc.) in an acid, aqueous reaction medium. Compound I is an intermediate for the preparation of 3-hydroxypicolinic acid amide of high purity and, via the latter, for the preparation of 2H-pyrido[2,3-e][1,3]oxazine-2,4-(3H)-dione which is useful as an analgetic, antipyretic and antiphlogistic.

---

This application is a division of Ser. No. 310,191 filed Sept. 18, 1963, now U.S. Patent No. 3,245,998, which is a continuation-in-part of Ser. No. 236,712 filed Nov. 9, 1962, now Patent No. 3,122,538.

The present invention concerns a new process for the production of 3,4-dihydro-2,4-dioxo-2H-pyrido[2,3-e][1,3]oxazine.

It has surprisingly been found that 3,4-dihydro-2,4-dioxo-2H-pyrido[2,3-e][1,3]oxazine of formula

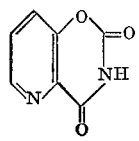

(I)

can be produced by treating 5-(2'-furyl)-hydantoin of formula

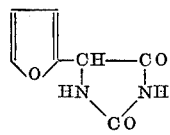

(II)

with an oxidizing agent in an acid, aqueous reaction medium. This conversion from furyl hydantoin to the aforesaid oxazine derivative by oxidizing agents is an unexpected, hitherto unknown reaction.

The production of the 5-(2'-furyl)-hydantoin of Formula II which is used as starting material, is described, for example, by Henze et al., J. Am. Chem. Soc. 64, 522 (1942) and Harvill et al., J. Org. Chem. 9, 21 (1944).

Halogen, in particular, is used as oxidizing agent. Chlorine is particularly well suited for this purpose either as gas or in the form of a substance which gives off chlorine under the reaction conditions. In the latter case, sodium hypochlorite is preferred as substance giving off chlorine. Bromine is also suitable as oxidizing agent.

The reaction medium is a solvent or diluent such as e.g. water to which a water-soluble polar organic solvent such as e.g. a lower alkanol or ethylene glycol, etc., can be added, and which must be acidified, for instance with aqueous acetic acid or hydrochloric acid.

The reaction according to the invention is particularly advantageous, when it is performed in hydrochloric acid-acidified, aqueous or aqueous/organic medium in which the furyl hydantoin to be reacted is suspended or dissolved. The reaction is performed preferably with cooling, at a temperature below room temperature, e.g., at $-20°$ C., but preferably at about 10° to 18° C. The acidity of the reaction medium corresponds, prior to the addition of the oxidizing agent, to that of about 0.5 to 8-normal hydrochloric acid, and preferably to 2 N to 4 N or even 6 N HCl in aqueous solution.

During the introduction of the oxidizing agent, the starting compound of Formula II need not be completely dissolved in the reaction medium, but it is sufficient to cause, for instance, chlorine or bromine to react on a suspension thereof in the aqueous, acid medium, whereby the volume of the reaction mixture can be kept smaller. Approximately 1 to 1.5 moles of chlorine or bromine, or an equivalent amount of hypochlorite are preferably used per mole of starting compound.

In order to obtain good yields, the action of the oxidizing agent on the acid suspension or solution of the furyl hydantoin of Formula II should last more than 30 minutes, but not longer than 2 hours, and preferably from 60 to 90 minutes.

The higher the temperature of the reaction medium, the sooner must the undissolved reaction product of Formula I be separated, e.g., by filtration, from the reaction mixture. Preferably, separation and further processing take place immediately when the temperature during the reaction period had been near room temperature, while, when it had been at lower temperatures, it is preferable to let the reaction mixture stand for about 10 minutes or longer, but for not more than 30 minutes after terminating the introduction of the oxidizing agent, whereby the reaction is allowed to proceed to substantial completion. The separated residue is preferably washed with acetone which serves to remove residual hydantoin therefrom.

The free base of Formula I is obtained by subsequent washing with cold or warm water, of, for instance, the hydrochloride salt of the compound of Formula I which precipitates during the reaction, if hydrochloric acid had been used for acidification of the reaction medium.

Purification is effected with water and/or methanol, and, if desired, with recrystallization from glacial acetic acid, or the like suitable solvents, in a conventional manner.

It has been found that, surprisingly, 3-hydroxypicolinic acid amide, of the formula

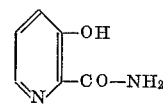

(III)

of enhanced purity can be obtained from the compound of Formula II via the compound of Formula I. After the oxazine of Formula I has been produced, it is subsequently reacted with water, preferably acidified or made alkaline by the addition of the corresponding agents, at room temperature for at least about 5 hours or at higher temperature of the mixture for a correspondingly shorter time.

The following Reaction Diagram I illustrates the above:

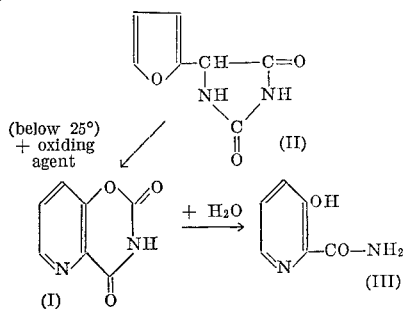

The compound of Formula III can be reacted with lower alkyl esters of chloroformic acid in the presence of quinoline or sym.-collidine to obtain 2H-pyrido[2,3-e][1,3]oxazine-2,4(3H)-dione which possesses excellent analgetic, antipyretic and antiphlogistic activity.

Example 1

114 g. of chlorine are introduced over 1½ to 2 hours at 15° while stirring vigorously into a suspension of 184 g. of pulverised 5-(2'-furyl)-hydantoin in 420 ml. of 2-N aqueous hydrochloric acid. The suspension is then immediately filtered, the residue is stirred with 300 ml. of acetone and again filtered. The 3,4-dihydro-2,4-dioxo-2H-pyrido[2,3-e-][1,3]oxazine hydrochloride formed can be converted into the base by washing with water until the filtrate runs neutral. The base is also obtained by dissolving the hydrochloride in 2-N sodium hydroxide solution and then neutralising with dilute hydrochloric acid. The base is recrystallised from boiling water, glacial acetic acid or pyridine with the addition of charcoal; it then melts at 280°. The compound has no reaction to ferric chloride (in methanol) and no precipitation with a solution of 2,4-dinitro-phenyl hydrazine in 2-N hydrochloric acid. Yield 25–35%.

Example 2

Gaseous chlorine, corresponding to a liquid amount of 3.5 ml. at −80° is introduced within 60 minutes at 11–15° into a solution of 8.3 g. of 5-(2'-furyl)-hydantoin in 25 ml. of 6-N aqueous hydrochloric acid and 25 ml. of methanol. The 3,4-dihydro-2,4-dioxo-2H-pyrido[2,3-e][1,3]oxazine hydrochloride formed is then filtered off, washed with 99% ethanol and dried. Yield 25–35%.

Example 3

5.52 g. of 5-(2'-furyl)-hydantoin hydrate are dissolved in 15 ml. of acetic acid and 15 ml. of water. Gaseous chlorine, corresponding to 1.5 ml. of liquid chlorine at −80°, is introduced at 19° within 15 minutes. After cooling to −20°, 30 ml. of 99% ethanol in 10 ml. of ether and 10 ml. of concentrated hydrochloric acid are added. After standing for 10 minutes at −20°, the 3,4-dihydro-2,4-dioxo-2H-pyrido[2,3-e][1,3]oxazine precipitates; it is filtered off, washed with 99% ethanol and dried. Yield 25–30%.

Example 4

92 g. of 5-(2'-furyl)-hydantoin are suspended, at similar temperature as in the preceding examples, in 210 ml. of 2-N hydrochloric acid, and, within 1 hour while stirring vigorously, 120 g. of bromine are added dropwise. Immediately after the addition of the bromine, the reaction mixture is filtered and the residue is washed first with acetone and then with water. After recrystallizing from glacial acetic acid, the 3,4-dihydro-2,4-dioxo-2H-pyrido[2,3-e][1,3]oxane obtained melts at 280°. It is identical with the substance obtained by treating 5-(2'-furyl)-hydantoin with chlorine. Yield 7–10%.

We claim:
1. A process for the production of 3,4-dihydro-2,4-dioxo-2H-pyrido[2,3-e][1,3]oxazine of formula

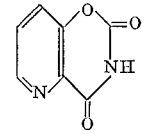

comprising mixing 5-(2'-furyl)-hydantoin of formula

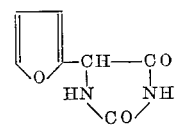

with an oxidizing agent, selected from the group consisting of chlorine, bromine and compounds which give off chlorine under the reaction conditions, in an aqueous medium having an acidity corresponding to that of 0.5 to 8-N hydrochloric acid, and maintaining the temperature of the mixture at from slightly below to room temperature until the ensuing reaction is complete, and then recovering the aforesaid oxazine of Formula I.

2. A process as described in claim 1, wherein the oxidizing agent is an elementary halogen having an atomic weight between 35 and 80.

3. A process as described in claim 1, wherein the oxidizing agent is chlorine.

4. A process as described in claim 1, wherein the action of the oxidizing agent on the hydantoin of Formula II lasts from about 30 minutes to not more than 2 hours.

5. A process as described in claim 1, wherein the action of the oxidizing agent on the hydantoin of Formula II lasts from about 60 to 90 minutes.

6. A process as described in claim 1, wherein the precipitate formed in the reaction medium is separated therefrom at a time ranging from immediately after termination of introduction of the oxidizing agent to not more than 30 minutes thereafter, depending on the temperature mentioned during the said introduction, separation being the sooner, the higher said temperature.

7. A process as described in claim 1, wherein the temperature is maintained at from about 10 to 18° C. during the introduction of the oxidizing agent.

References Cited
UNITED STATES PATENTS 3,280,120   10/1966   Petracek _____ 260—244

HENRY R. JILES, *Primary Examiner.*

R. T. BOND, *Assistant Examiner.*